United States Patent
Izumi et al.

(10) Patent No.: US 10,417,778 B2
(45) Date of Patent: Sep. 17, 2019

(54) ULTRASONIC DIAGNOSTIC APPARATUS AND MEDICAL IMAGE PROCESSING APPARATUS

(71) Applicant: Toshiba Medical Systems Corporation, Otawara-shi (JP)

(72) Inventors: Minori Izumi, Shioya (JP); Tatsuru Kurosaki, Nasushiobara (JP); Nobuhide Ooi, Nasushiobara (JP); Takashi Masuda, Utsunomiya (JP)

(73) Assignee: Canon Medical Systems Corporation, Otawara-shi (JP)

( * ) Notice: Subject to any disclaimer, the term of this patent is extended or adjusted under 35 U.S.C. 154(b) by 176 days.

(21) Appl. No.: 15/352,976

(22) Filed: Nov. 16, 2016

(65) Prior Publication Data
US 2017/0221202 A1    Aug. 3, 2017

(30) Foreign Application Priority Data

Jan. 29, 2016 (JP) ................. 2016-015074
Sep. 13, 2016 (JP) ................. 2016-178236

(51) Int. Cl.
*G06T 7/00* (2017.01)
*G06T 7/33* (2017.01)

(52) U.S. Cl.
CPC .... *G06T 7/337* (2017.01); *G06T 2207/10132* (2013.01)

(58) Field of Classification Search
CPC ........... G06T 7/337; G06T 2207/10132
See application file for complete search history.

(56) References Cited

U.S. PATENT DOCUMENTS

| 5,879,303 A * | 3/1999 | Averkiou ................. A61B 8/08 600/447 |
| 5,908,389 A * | 6/1999 | Roundhill .............. A61B 8/463 600/443 |
| 6,228,031 B1 * | 5/2001 | Hwang ............... G01S 7/52095 600/447 |
| 6,251,074 B1 * | 6/2001 | Averkiou ................. A61B 8/08 600/447 |
| 6,497,666 B1 * | 12/2002 | Phillips .................. A61B 8/481 600/458 |
| 8,266,966 B2 * | 9/2012 | Ichigo .................... G01N 29/12 367/7 |
| 2004/0002653 A1 * | 1/2004 | Greppi ..................... A61B 8/06 600/439 |

(Continued)

FOREIGN PATENT DOCUMENTS

| JP | 2009-297072 A | 12/2009 |
| JP | 2015-528343 | 9/2015 |
| JP | 2015-173899 | 10/2015 |

*Primary Examiner* — Mekonen T Bekele
(74) *Attorney, Agent, or Firm* — Oblon, McClelland, Maier & Neustadt, L.L.P.

(57) ABSTRACT

In one embodiment, an ultrasonic diagnostic apparatus includes memory circuitry configured to store a program and processing circuitry configured, by executing the program, to perform alignment between one of live images and one of reference images. The live images include a fundamental image and a harmonic image both of which are acquired by contrast imaging, the reference images are acquired prior to the live images, and the alignment is performed by using the fundamental image as one of the live images.

7 Claims, 7 Drawing Sheets

(56) References Cited

U.S. PATENT DOCUMENTS

| | | | |
|---|---|---|---|
| 2008/0127722 A1* | 6/2008 | Su | B82Y 35/00 |
| | | | 73/105 |
| 2009/0306514 A1* | 12/2009 | Imamura | A61B 8/14 |
| | | | 600/458 |
| 2011/0216952 A1* | 9/2011 | Kajihara | G06K 9/00 |
| | | | 382/128 |
| 2013/0079638 A1* | 3/2013 | Osawa | A61B 8/4494 |
| | | | 600/443 |
| 2015/0213613 A1 | 7/2015 | Prevost et al. | |
| 2015/0313576 A1* | 11/2015 | Yamamoto | A61B 8/5207 |
| | | | 600/447 |
| 2016/0018520 A1* | 1/2016 | Hirai | A61B 8/5261 |
| | | | 367/11 |
| 2016/0050536 A1* | 2/2016 | You | G06F 17/30241 |
| | | | 455/456.3 |
| 2017/0172547 A1* | 6/2017 | Ito | A61B 8/52 |

* cited by examiner

STORAGE OF FUNDAMENTAL IMAGES AND HARMONIC IMAGES

ULTRASONIC DIAGNOSTIC APPARATUS AND MEDICAL IMAGE PROCESSING APPARATUS

CROSS-REFERENCE TO RELATED APPLICATION

This application is based upon and claims the benefit of priority from Japanese Patent Application No. 2016-015074, filed on Jan. 29, 2016, and Japanese Patent Application No. 2016-178236 filed on Sep. 13, 2016, the entire contents of each of which are incorporated herein by reference.

FIELD

Embodiments described herein relate generally to an ultrasonic diagnostic apparatus and a medical image diagnostic apparatus.

BACKGROUND

An ultrasonic diagnostic apparatus is conventionally known as a medical image diagnostic apparatus. An ultrasonic diagnostic apparatus is configured to generate an image inside an object using ultrasonic waves, and a medical image interpretation specialist, such as a medical doctor or radiologist, interprets the generated image inside the object.

In the present specification, an ultrasonic image which was imaged in the past by an ultrasonic diagnostic apparatus and used as a reference is referred to as a "reference image" and an ultrasonic image to be generated in an examination performed from now on is referred to as a "live image". In the field of an ultrasonic diagnostic apparatus, a method of simultaneously displaying a reference image and a live image has been studied. For instance, a method has been studied, in which a three-dimensional image, which has been already imaged, based on three-dimensional image data is treated as a reference image and is displayed together with a live image corresponding to the reference image.

Here, when ultrasonic imaging is conducted using a contrast agent in the contrast mode, special transmission and reception of ultrasonic wave are used to obtain only the echoes caused by the contrast agent, while tissue signals are canceled. In other words, tissue structure is not depicted in a contrast-enhanced image generated in the contrast mode. Thus, alignment of a live image to be generated in the contrast mode and a reference image in which tissue structure is not depicted is difficult, because characteristics of any tissue structure are not depicted in both images.

DETAILED DESCRIPTION

In one embodiment, an ultrasonic diagnostic apparatus includes memory circuitry configured to store a program and processing circuitry configured, by executing the program, to perform alignment between one of live images and one of reference images. The live images include a fundamental image and a harmonic image both of which are acquired by contrast imaging, the reference images are acquired prior to the live images, and the alignment is performed by using the fundamental image as one of the live images.

Hereinafter, embodiments of ultrasonic diagnostic apparatuses and medical image diagnostic apparatuses will be described with reference to the accompanying drawings.

(First Embodiment)

Figure 1:
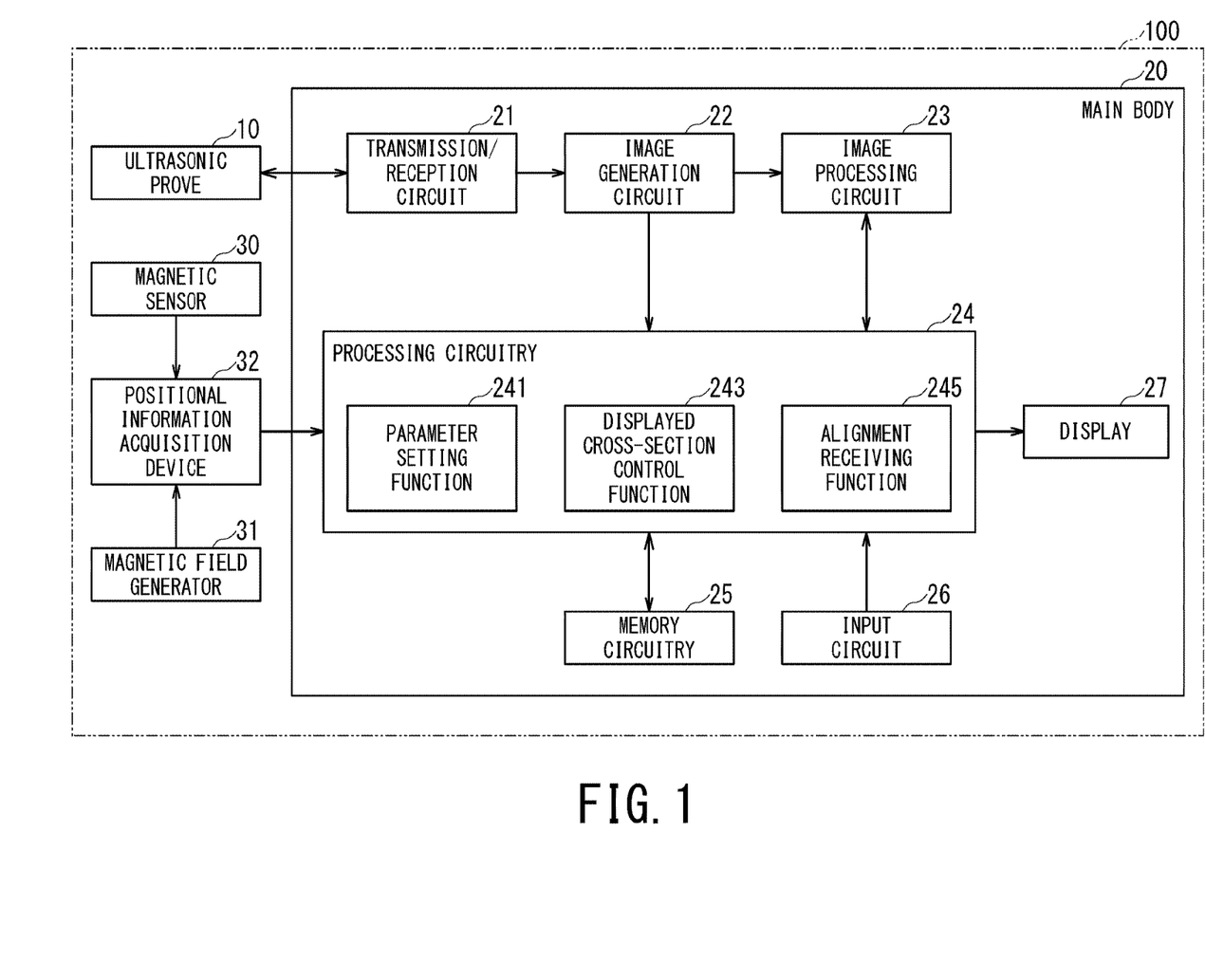
FIG. 1 is a schematic block diagram illustrating overall configuration of the ultrasonic diagnostic apparatus of the first embodiment.

FIG. 1 is a schematic block diagram illustrating overall configuration of an ultrasonic diagnostic apparatus 100 of the first embodiment.

As shown in FIG. 1, the ultrasonic diagnostic apparatus 100 of the first embodiment includes an ultrasonic prove 10, a main body 20, a magnetic sensor 30, a magnetic field generator 31, and a positional information acquisition device 32.

The ultrasonic prove 10 is equipped with ultrasonic transducers. Each of the ultrasonic transducers converts an electric driving signal into a transmission ultrasonic wave in a transmission operation, and converts a reflected ultrasonic wave (i.e., received ultrasonic wave) into an electric received signal in a reception operation. The magnetic sensor 30 is attached to or included in the ultrasonic prove 10.

Here, a technique of generating a three-dimensional image of an organ and/or a blood flow is known. In this technique, the three-dimensional image is generated based on received signals obtained by manually and arbitrarily scanning an object surface with the ultrasonic prove 10 and positional information acquired from the magnetic sensor 30. According to this technique, a desired orientation cross-section image, such as an axial cross-section, a sagittal cross-section, a coronal cross section or an oblique cross-section image can be generated from the three-dimensional image and displayed on the display. Incidentally, a displayed cross-sectional image may be referred to as an ultrasonic tomographic image.

The main body 20 includes a transmission/reception circuit 21, an image generation circuit 22, an image processing circuit 23, processing circuitry 24, memory circuitry 25, an input circuit 26, and a display 27.

The transmission/reception circuit 21 includes a transmission circuit and a reception circuit. The transmission circuit has a function of supplying the ultrasonic prove 10 with a driving signal for radiating a transmission ultrasonic wave in a predetermined direction of an object. The reception circuit is equipped with a phase detector and a beamformer. The phase detector decomposes each of the received signals of plural channels received from the ultrasonic prove 10 into an in-phase signals (i.e., I-signals) and a quadrature-phase signals (i.e., Q-signals) of the baseband, and converts those I-signals and Q-signals into digital signals. The beamformer provides a predetermined delay to those I-signals and Q-signals of the respective channels and add the delayed I-signals and Q-signals so as to form a beam. Then, the reception circuit outputs the formed beam as a beam signal to the image generation circuit 22.

The image generation circuit 22 acquires the beam signal from the reception circuit of the transmission/reception circuit 21. For instance, in a B-mode, the image generation circuit 22 generates image data of a B-mode image by detecting an envelope of the beam signal. In a color Doppler mode, the image generation circuit 22 generates image data of a color Doppler image by performing processing such as autocorrelation on the beam signal. Further, in a pulse Doppler mode or a continuous-wave Doppler mode, the image generation circuit 22 generates image data of a Doppler image by applying fast Fourier transform (FFT) to the beam signal.

Hereinafter, image data generated by the image generation circuit 22 such as image data of a B-mode image, image data of a color Doppler image, and image data of a continuous-wave Doppler image are also referred to as ultrasonic image data. The image generation circuit 22 outputs generated ultrasonic image data to the image processing circuit 23, and causes the memory circuitry 25 to store the ultrasonic image data via the processing circuitry 24.

The image processing circuit 23 has a function of performing coordinate conversion on ultrasonic image data generated by the image generation circuit 22 so that a coordinate system after the coordinate conversion matches an imaging cross-section of an object. For instance, the image processing circuit 23 converts a coordinate system of ultrasonic image data from an apparatus coordinate system of the ultrasonic diagnostic apparatus 100 used in a scan (e.g., Azimuth and Range) into a coordinate system appropriate for TV-scan image display. Additionally, the image processing circuit 23 has a function of performing image processing on the ultrasonic image data subjected to the above coordinate conversion so that respective setting values of gradation, resolution, and a frame rate are changed to values appropriate for image display.

The processing circuitry 24 has a function of controlling the entirety of the ultrasonic diagnostic apparatus 100. The processing circuitry 24 is, e.g., a processor configured to implement functions corresponding to programs by reading out the programs from the memory circuitry 25 and executing the programs. For instance, the processing circuitry 24 implements a parameter setting function 241, a displayed cross-section control function 243, and an alignment receiving function 245 by reading out and executing the programs corresponding to them.

The parameter setting function 241 is a function of setting parameters for a contrast-enhanced scan and parameters for a non-contrast-enhanced scan.

The displayed cross-section control function 243 is, for example, a function of continually extracting a cross-section, after alignment, from the volume data of the reference image by using a relative position of the magnetic sensor 30 with respect to a position of the same when the alignment of a certain live image and a reference image is completed.

Assuming a position of the ultrasonic prove 10 at a time when the alignment has completed as a reference position, the relative position of the magnetic sensor 30 indicates how far and in which direction the ultrasonic prove 10 is moved from the reference position of the magnetic sensor 30.

Further, the displayed cross-section control function 243 has a function of causing the display 27 to display the updated live image time-sequentially acquired on a real-time basis in contrast imaging and the reference image which has already been imaged, in such a manner that the reference image is displayed in synchronization with each live image.

The alignment receiving function 245 is a function of receiving alignment information. The alignment information is obtained such that an object depicted in the live image and an object depicted in the reference image are observed to be the same, in a state where the live image and the reference image are displayed on the display 27 and the live image and reference image are compared with each other.

While the live image includes a fundamental image and a harmonic image when the contrast imaging is performed, the alignment receiving function 245 uses the fundamental image of the live image when alignment is performed between the reference image and the live image.

Additionally or alternatively, while the reference image includes a fundamental image and a harmonic image when the contrast imaging is performed, the alignment receiving function 245 uses the fundamental image of the reference image when alignment is performed between the reference image and the live image.

The memory circuitry 25 includes memory elements such as a read-only memory (ROM) and a random access memory (RAM). The memory circuitry 25 stores the above-described programs, an initial program loading (IPL), and data of a basic input/output system (BIOS). Additionally, the memory circuitry 25 is used as a working memory of the processing circuitry 24 and a memory region of the ultrasonic image data. Further, the memory circuitry 25 stores image data of the reference image, which is configured as volume data. In this case, the volume data can be considered to include one volume part corresponding to the fundamental image and another volume part corresponding to the harmonic image, and the fundamental image and the harmonic image are associated with each other in the respective volume parts. Here, note that the fundamental image of the reference image and the harmonic image of the reference image are each a cross-sectional image, i.e., an ultrasonic tomographic image, extracted or cut out from the respective volume parts of the volume data. As to the fundamental image and the harmonic image, they will be described below in more detail.

The input circuit 26 is configured to input a signal from an input device to the processing circuitry 24. The input device is, e.g., a keyboard and a pointing device which an operator such as a doctor and an inspection engineer can operate, and can be considered to be a part of the input circuit 26. In this case, an input signal in accordance with operation is transmitted from the input circuit 26 to the processing circuitry 24.

The display 27 has a function of displaying ultrasonic image data of an object imaged with the use of the ultrasonic prove 10 as an image. The display 27 is configured of, e.g., a liquid crystal display and/or a monitor. In the first embodiment, the display 27 displays the reference image as well as the live image. As mentioned below, after alignment is completed, the display 27 displays the reference image (or the cross-sectional image extracted from the reference image) and the time-sequentially acquired live images, in such a manner that the reference image is updated in synchronization with the live image, depending on the motion of the ultrasonic prove 10.

The term "processor" used in the above description means, e.g., a circuit such as a special-purpose or general-purpose central processing unit (CPU), an application specific integrated circuit (ASIC), a programmable logic device including a simple programmable logic device (SPLD) and a Complex programmable logic device (CPLD), and a field programmable gate array (FPGA).

A processor implements various types of functions by reading out programs stored in the memory circuitry 25 as a memory and executing the programs. Additionally or alternatively, those programs may be directly installed in a circuit of a processor instead of storing those programs in the memory circuitry 25 so that the processor implements various types of functions by reading out those programs stored in its own circuit and executing those programs. When plural processors are provided for the processing circuitry 24, for instance, a memory medium for storing the programs may be provided for each processor or the memory circuitry 25 shown in FIG. 1 may collectively store all the programs corresponding to all the functions of the processors.

The magnetic sensor 30 is attached to the ultrasonic prove 10. The magnetic sensor 30 may be provided in the ultrasonic prove 10. The magnetic sensor 30 acquires position-and-attitude data by measuring a position and an attitude of the ultrasonic prove 10 put on a surface of an object, by detecting a magnetic field, which is emitted from the magnetic field generator 31. For instance, the magnetic sensor 30 acquires a position and an attitude (or an orientation) of the ultrasonic prove 10 by acquiring position-and-attitude data corresponding to six degrees of freedom, including positional information items of three-dimensional coordinates (x, y, z) and attitude information items of a three-dimensional attitude (Pitch, Yaw, Roll).

The magnetic field generator 31 is disposed adjacent to an object, and is configured to generate a magnetic field for causing the magnetic sensor 30 to perform positional measurement.

The positional information acquisition device 32 performs various types of control operations in such a manner that the magnetic field generator 31 generates a magnetic field and the magnetic sensor 30 measures the generated magnetic field.

The ultrasonic diagnostic apparatus 100 of the first embodiment is configured to operate according to the following three phases. In the first phase, processing of acquiring the reference image is performed. In the second phase, processing of alignment between the reference image and the live images is performed. In the third phase, link information transfer is performed. Hereinafter, details of these three phases will be described in order.

(First Phase: Processing of Acquiring Reference Image)

The processing performed by the ultrasonic diagnostic apparatus 100 of the first embodiment will be described. In the first phase, an image data is acquired to generate the reference image by performing a contrast-enhanced scan and a non-contrast-enhanced alternately, as described below. Usually, the scans for generating the reference image are performed, for example, immediately before a surgical operation or one week before the surgical operation.

The reference image is acquired in order to diagnose the conditions of the object (e.g., the patient) before conducting the operation or treatment, and the reference image is used together with the live image for determining an effect of percutaneous radiofrequency ablation treatment or performing a follow-up observation for disease, after or during the operation or treatment.

Figure 2:
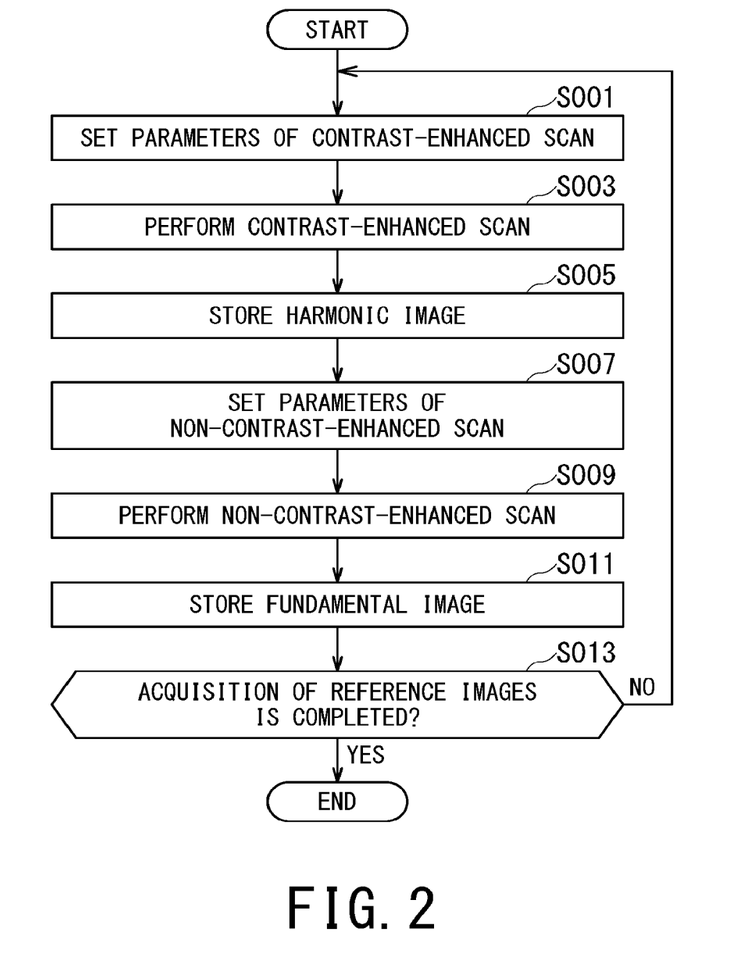
FIG. 2 is a flowchart illustrating processing of generating volume data of an image inside an object's body by scanning a body surface of this object with the use of the ultrasonic diagnostic apparatus of the first embodiment.

FIG. 2 is a flowchart illustrating processing of acquiring volume data for the reference image, according to the ultrasonic diagnostic apparatus 100 of the first embodiment. In FIG. 2, each sign consisting of "S" and number on its right side indicates each step of the flowchart.

First, an operator powers on the ultrasonic diagnostic apparatus 100 so as to bring the ultrasonic diagnostic apparatus 100 to a state in which a predetermined examination target in an object can be imaged. An ultrasonic contrast agent may be injected into the object at this stage.

In the step S001, the ultrasonic diagnostic apparatus 100 sets parameters of a contrast-enhanced scan, by which a harmonic image is acquired.

In the step S003, an operator puts the ultrasonic prove 10 onto a body surface of the examination target of the object, and the main body 20 acquires position-and-attitude data of the ultrasonic prove 10, i.e., position-and-attitude information of the ultrasonic prove 10 from the magnetic sensor 30. The main body 20 receives ultrasonic signals, which are originally detected by the ultrasonic prove 10, from the transmission/reception circuit 21 so as to generate an ultrasonic cross-sectional image (or an ultrasonic tomographic image). As mentioned above, the ultrasonic cross-sectional image generated in the contrast-enhanced scan is referred to as the harmonic image. Note that each harmonic image is acquired while the ultrasonic prove 10 is moving, and each harmonic image is associated with the position-and-attitude information, which is obtained by the magnetic sensor 30 attached to the ultrasonic prove 10.

In the step S005, when generation of the ultrasonic cross-sectional image under the contrast-enhanced scan in the step S003 is completed, the main body 20 stores the generated ultrasonic cross-sectional image (i.e., the generated harmonic image) in the memory circuitry 25, together with the position-and-attitude information. That is, each harmonic image is stored in the memory circuitry 25, while being associated with the respective corresponding position-and-attitude information. Note that each harmonic image is acquired frame by frame. Thus, each harmonic image is also stored frame by frame. In the first embodiment, the processing from the steps S001 to S013 is repeated to generate plural ultrasonic cross-sectional images (i.e., plural harmonic images), which are associated with the respective position-and-attitude information, resulting in generating a harmonic 3-D image.

In the step S007 (i.e., after storing data of one frame of a harmonic image under a contrast-enhanced scan), the main body 20 sets parameters of a non-contrast-enhanced scan in order to perform the non-contrast-enhanced scan for the next frame. Note that, by performing the non-contrast-enhanced scan, a fundamental image is generated.

In the step S009, the main body 20 performs a non-contrast scan. That is, the main body 20 receives (a) an ultrasonic signal detected by the ultrasonic prove 10 and (b) position-and-attitude information of the ultrasonic prove 10 at this imaging time from the transmission/reception circuit 21 so as to generate an ultrasonic cross-sectional image (an ultrasonic tomographic image) under a non-contrast-enhanced scan. As mentioned above, in the first embodiment, the ultrasonic cross-sectional image or the ultrasonic tomographic image under the non-contrast-enhanced scan is referred to as the fundamental image.

In the step S011 (i.e., after generation of the fundamental image under the non-contrast-enhanced scan is completed by the image generation circuit 22), the main body 20 associates the fundamental image generated in the step S009 with the position-and-attitude information corresponding to the imaging time of this image. Then, the main body 20 stores the fundamental image generated in the step S009 including the associated position-and-attitude information in such a manner that the associated position-and-attitude information is included therein as accompanying information. Similarly to the harmonic image, each fundamental image is acquired frame by frame. Thus, each fundamental image is also stored frame by frame. Further similarly, in the first embodiment, the processing from the steps S001 to S013 is repeated to generate plural ultrasonic cross-sectional images (i.e., plural fundamental images), which are associated with the respective position-and-attitude information, resulting in generating a fundamental 3-D image.

Figure 3:
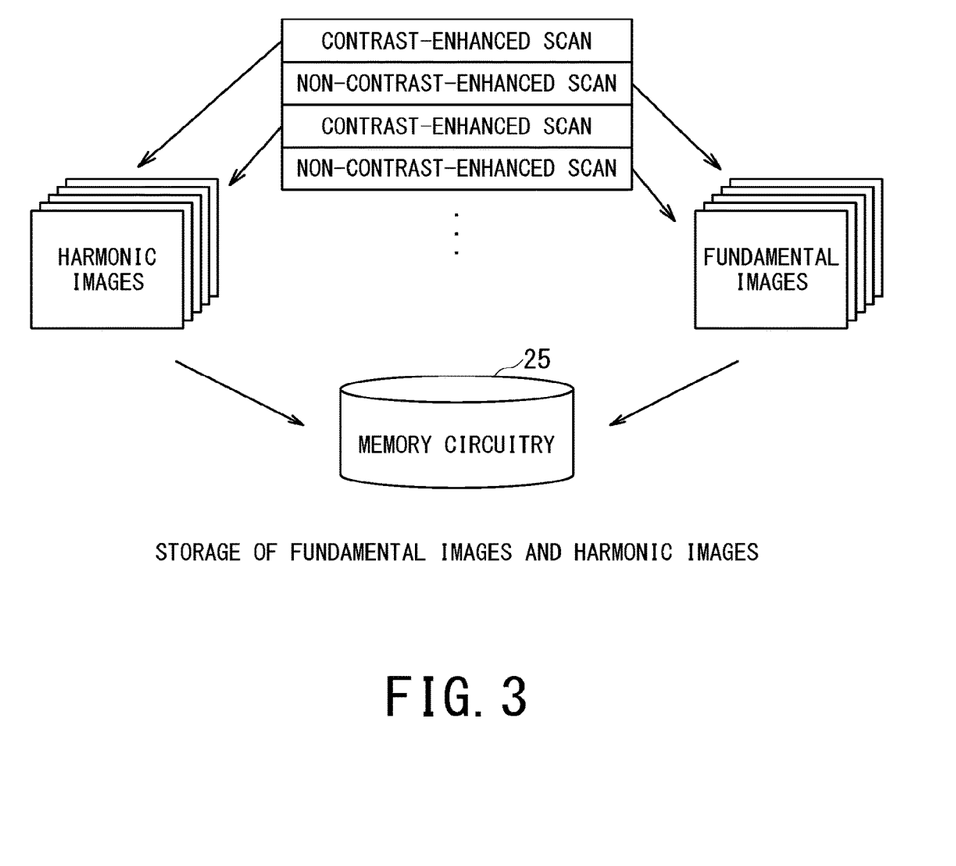
FIG. 3 is a conceptual diagram illustrating an operation in which a contrast-enhanced scan and a non-contrast scan are alternately performed.

FIG. 3 is a conceptual diagram illustrating an operation in which a contrast-enhanced scan and a non-contrast-enhanced scan are alternately performed. In the following description, processing of alternately performing a contrast-enhanced scan and a non-contrast-enhanced scan is simply referred to as a contrast imaging.

As shown in FIG. 3, the ultrasonic diagnostic apparatus 100 of the first embodiment automatically repeats processing of alternately and repeatedly generating harmonic images and fundamental images so as to store the generated harmonic images and fundamental images in the memory circuitry 25.

Respective cross-sectional images generated as the fundamental images constitute volume data of the fundamental 3-D image. Similarly, respective cross-sectional images generated as the harmonic images constitute volume data of the harmonic 3-D image. As described above, two types of images (i.e., a fundamental image and a harmonic image) are included in the reference image to be stored in the memory circuitry 25.

Although the ultrasonic diagnostic apparatus 100 generates harmonic images and fundamental images so as to generate volume data of those fundamental images and volume data of those harmonic images in the first embodiment, the present embodiments are not limited to such an aspect. Other aspects of the present embodiments will be described below.

Returning back to FIG. 2, the description of the flowchart is continued.

In the step S013, when acquisition of the reference images consisting of the harmonic images and the fundamental images with the use of a contrast agent is completed (i.e., YES in the step S013), the ultrasonic diagnostic apparatus 100 completes the processing of generating volume data of images inside an object's body. When acquisition of reference images is not completed (i.e., No in the step S013), the processing goes back to the step S001 and the ultrasonic diagnostic apparatus 100 repeats the processing from the steps S001 to S011 until acquisition of the reference image is completed.

The processing of generating volume data of images inside an object's body as the first phase is performed in the above-described manner.

(Second Phase: Processing of Alignment)

Next, processing of aligning the reference image and the live image will be described. While the reference image is an image of an object having been imaged in the past, the live image is an image generated by imaging an object from now on or an image of an object being imaged on a real-time basis. It is assumed that the contrast imaging is also performed in acquisition of the live image. Thus, processing of alternately acquiring a fundamental image and a harmonic image is repeated, and in this manner, plural fundamental images and plural harmonic images are acquired in the processing of acquiring the live image.

In the following description of FIG. 4, it is assumed that comparative medical image interpretation is performed by comparing the reference image having been imaged prior to acquisition of the live image to be imaged from now on, for example, when determining an effect of percutaneous radiofrequency ablation treatment or performing a follow-up observation for disease.

Figure 4:
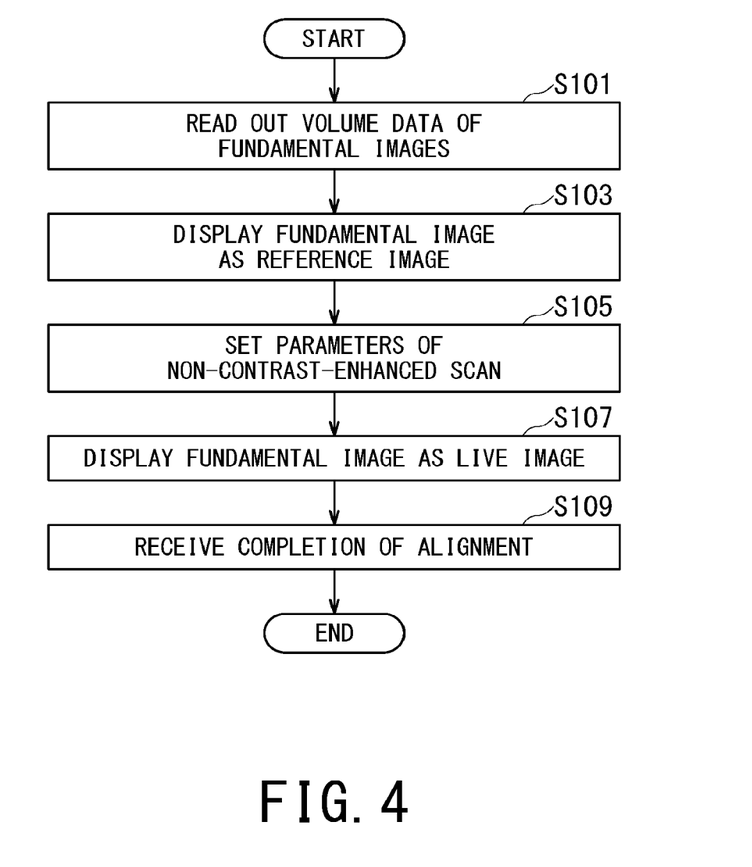
FIG. 4 is a flowchart illustrating processing of receiving data of alignment of a reference image having already been acquired and a live image to be acquired in an examination from now on, according to the ultrasonic diagnostic apparatus of the first embodiment.

FIG. 4 is a flowchart illustrating processing of the alignment between one of the cross sectional images selected from the reference image having already been acquired and the current live image (i.e., the present time live image), according to the ultrasonic diagnostic apparatus 100 of the first embodiment. In FIG. 4, each sign consisting of "S" and number on its right side indicates each step of the flowchart.

First, an operator selects desired one of the fundamental images from the reference image, more specifically, from the fundamental 3-D image stored in the memory circuitry 25, by manipulating the input circuit 26 of the ultrasonic diagnostic apparatus 100.

In the step S101, the ultrasonic diagnostic apparatus 100 reads out the selected fundamental image from the memory circuitry 25, according to a command inputted by an operator.

In the step S103, the ultrasonic diagnostic apparatus 100 causes the display 27 to display the selected fundamental view, which is a cross-sectional image of the reference image. In other words, an operator selects a cross-section of the fundamental 3-D image (i.e., a fundamental image), and then the ultrasonic diagnostic apparatus 100 displays the fundamental image selected by this operator on the display 27 as a reference when aligning a current live image to the displayed fundamental image.

In the next step S105, the operator sets parameters of a non-contrast-enhanced scan (sets scan parameters to values appropriate for a non-contrast-enhanced scan) for acquiring a live image corresponding to a fundamental image, by manipulating the input circuit 26. The ultrasonic diagnostic apparatus 100 receives setting of parameters of a non-contrast-enhanced scan, and causes the processing circuitry 24 and the display 27 to display a fundamental image which is updated on a real time basis as a live image. In the step S107, the ultrasonic diagnostic apparatus 100 continues to display the fundamental image as a live image on the display 27 at the time of alignment of the updated live image and the selected reference image.

In the step S109, an operator aligns the updated fundamental image (i.e., a cross-sectional image imaged as a live image) to the fundamental image selected as a reference image, by adjusting the position and/or the attitude of the ultrasonic prove 10. In this case, the alignment is performed manually. For instance, an operator observes both the live image and the reference image while moving the ultrasonic prove 10, and determines whether both images are coincide with each other.

Figure 5:
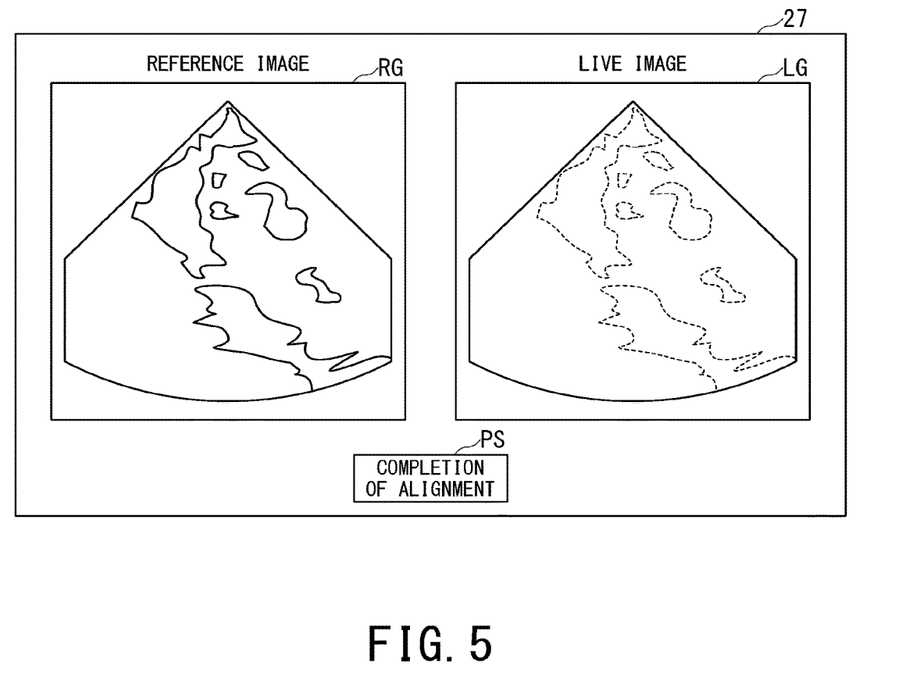
FIG. 5 is a schematic diagram illustrating a screen of simultaneously displaying a reference image on the left side and a live image on its right side such that both images can be compared with each other, according to the ultrasonic diagnostic apparatus of the first embodiment.

FIG. 5 is a schematic diagram illustrating a screen of the display 27 on which a reference image RG is displayed on the left side and a live image LG is simultaneously displayed on its right side such that both can be compared with each other, according to the ultrasonic diagnostic apparatus 100 of the first embodiment.

As shown in FIG. 5, the ultrasonic diagnostic apparatus 100 displays a fundamental image as the live image LG on the right side of the display 27 and displays a fundamental image as the reference image RG on the left side of the display 27, when aligning the live image to the selected reference image. An alignment completion button PS is also displayed on the display 27. When the operator determines the alignment is completed (i.e., the live image coincides with the reference image), the operator presses the alignment completion button PS.

In the step S109, when the alignment completion button PS is pressed by the operator, the ultrasonic diagnostic apparatus 100 receives a signal which indicates the alignment has been completed. Further, the ultrasonic diagnostic apparatus 100 receives the position and attitude information of the ultrasonic prove 10 when the alignment completion button PS is pressed, i.e., when the alignment is completed. Position and attitude information about the ultrasonic prove 10 when the alignment is completed may be referred to as link information. Position and orientation information about the selected reference image may be included in the link information. By using the link information, the reference image and the live image are linked with each other. In other words, once the link information has been obtained, a cross sectional image cut out from the reference image can be changed in synchronization with the live image, by using the link information and information on the current position and attitude the ultrasonic prove 10.

In this manner, the ultrasonic diagnostic apparatus 100 of the first embodiment completes the processing of alignment of a reference image and a live image both of which are fundamental images, in the second phase.

In the first embodiment, the ultrasonic diagnostic apparatus 100 automatically performs processing of the third phase immediately after completing the second phase (i.e., processing of alignment). In the third phase, the fundamental image of the reference image is switched to the harmonic image of reference image. Similarly, the fundamental image of the live image is switched to the harmonic image of the live image. Further, the link information described above is also transferred from the fundamental image to the harmonic image.

(Third Phase: Link-Information Transfer Processing)

Figure 6:
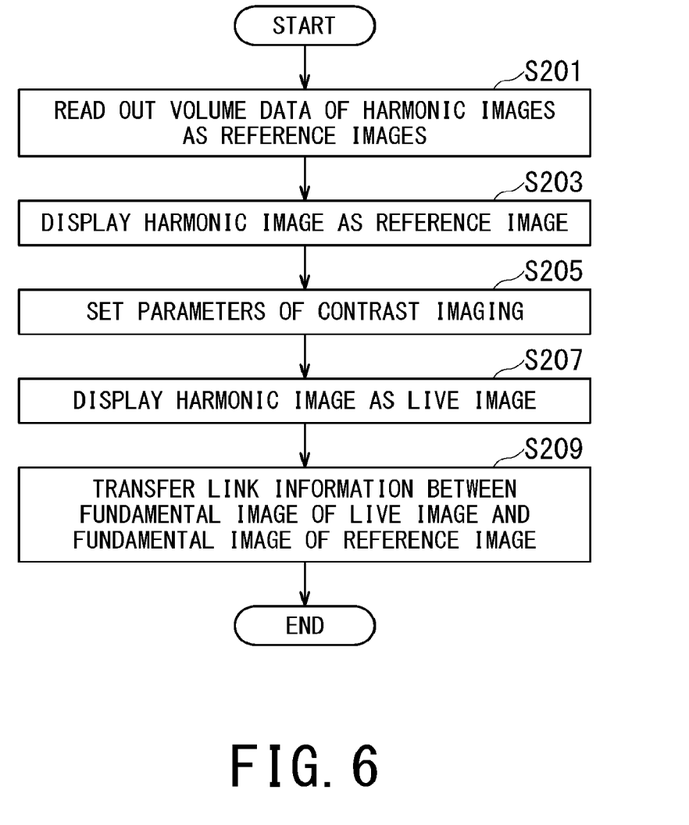
FIG. 6 is a flowchart illustrating processing of transfer of link information in which position-and-attitude information of a live image and a reference image is transferred, according to the ultrasonic diagnostic apparatus of the first embodiment.

FIG. 6 is a flowchart illustrating processing of transfer of the link information in which position-and-attitude information of a fundamental image of live images and a fundamental image selected as a reference image is transferred, according to the ultrasonic diagnostic apparatus 100 of the first embodiment. In FIG. 6, each sign consisting of "S" and number on its right side indicates each step of the flowchart.

When alignment of a fundamental image of a live image and a fundamental image selected as a reference image is completed and the alignment completion button PS is pressed, link information of this alignment is generated, and the processing shown in FIG. 6 starts as follows.

First, in the step S201, the ultrasonic diagnostic apparatus 100 automatically reads out volume data of a harmonic image of an object as a reference image from the memory circuitry 25.

In the step S203, the ultrasonic diagnostic apparatus 100 causes the display 27 to display the harmonic image of the reference image read in the step S201. Specifically, after alignment of a fundamental image of live image and a fundamental image of reference image is completed, in the step S203, the ultrasonic diagnostic apparatus 100 switches the fundamental image displayed as a reference image to the harmonic image of reference image. Note that the harmonic image on the display 27 corresponds to the fundamental image, which has been aligned in alignment processing of the step S109.

In the step S205, in order to perform an examination under contrast imaging on an object, the ultrasonic diagnostic apparatus 100 automatically sets respective imaging conditions such as scan parameters in the image generation circuit 22 to values appropriate for the contrast imaging.

In the step S207, the ultrasonic diagnostic apparatus 100 sequentially generates a harmonic image so as to display the newly generated harmonic image on the display 27 as the live image. Specifically, the processing circuitry 24 causes the image generation circuit 22 to receive ultrasonic signals detected by the ultrasonic prove 10 from the transmission/reception circuit 21 and generate a harmonic image. In other words, the ultrasonic diagnostic apparatus 100 switches a fundamental image displayed as a live image to the newly generated harmonic image.

Note that, the harmonic image of the live image, which is displayed on the display 27 immediately after being switched, corresponds to the fundamental image of the live image which has been aligned in alignment processing of the step S109, similarly to the reference image.

In the step S209, the ultrasonic diagnostic apparatus 100 transfers the above-described link information obtained from the fundamental images of the reference image and the live image to the harmonic images of the reference image and the live image. As a result, the ultrasonic diagnostic apparatus 100 can extract the same cross-section from the volume data of harmonic images of the reference image as the harmonic image of the live images, and display the aligned harmonic images. In this manner, the ultrasonic diagnostic apparatus 100 completes link-information transfer processing as the third phase.

Each time an operator manipulates the ultrasonic prove 10, a newly generated harmonic image corresponding to this manipulation is displayed as the live image. In the meantime, a harmonic image of the reference image indicating the same part of the same object is also displayed on the display 27 also changes depending on the manipulation of the ultrasonic prove 10 and the link information, As described above, when alignment is performed between a live image and a reference image, the ultrasonic diagnostic apparatus 100 of the first embodiment displays a fundamental image on the display 27 as a live image. This is because, if a harmonic image is displayed as a live image, characteristics of tissue structures are not displayed and thus it is difficult to align such a live image with a reference image.

Thus, the ultrasonic diagnostic apparatus 100 of the first embodiment displays a fundamental image, in which characteristics of tissue structures is clearly depicted, as a live image in alignment, and thus alignment between a live image and a reference image can be accurately and easily performed.

Additionally, when a reference image and a live image are switched from a fundamental image to a harmonic image on the display 27 after completing alignment, alignment information (i.e., link information between a reference image and a live image) is transferred to a harmonic image of a live image and a harmonic image of a reference image. Thus, when comparative medical image interpretation is performed between a harmonic image of the live image and a harmonic image of the reference image, synchronization of the two fundamental images can be continued into the two harmonic images, and thus comparative medical image interpretation can be easily and precisely performed.

As described above, in the step S109 of FIG. 4, an operator manually performs alignment, and then the processing circuitry 24 receives completion of the alignment in the first embodiment. However, embodiments of the present disclosure are not limited to such an aspect. For instance, alternatively, the ultrasonic diagnostic apparatus 100 may automatically perform alignment between a fundamental image of a reference image and a fundamental image of a live image based on known pattern matching processing in the step S109 of FIG. 4.

Further, as described above, the ultrasonic diagnostic apparatus 100 alternately generates a harmonic image and a fundamental image by alternately repeating a contrast-enhanced scan and a non-contrast-enhanced scan so as to automatically generate volume data of both of the harmonic image and the fundamental image in contrast imaging as shown in FIG. 2 and FIG. 3 in the first embodiment. However, embodiments of the present disclosure are not limited to such an aspect. For instance, volume data of the harmonic image and volume data of the fundamental image may be generated by another method.

In the case shown in FIG. 2 and FIG. 3, when contrast imaging is performed, each of a harmonic image and a fundamental image is alternately generated frame by frame from the received signal. However, for instance, fundamental components and harmonic components in in the received signal may be stored as it is so that a harmonic image and a fundamental image are generated afterwards as needed. In this case, the ultrasonic diagnostic apparatus 100 stores the fundamental components and the harmonic components in the memory circuitry 25 without change. Then, when the fundamental image is needed, the fundamental image is generated from the fundamental components. Meanwhile, when the harmonic image is needed, the harmonic image can be generated from the harmonic components by applying a harmonic filter to the harmonic components as needed.

Further, in the first embodiment, one reference image RG is displayed on the left side of the display 27 and one live image LG is simultaneously displayed on the right side of this reference image RG as shown in FIG. 5 so that both can be compared with each other. However, embodiments of the present disclosure are not limited to such an aspect.

The ultrasonic diagnostic apparatus 100 can display plural reference images on the display 27 so that the link information is transferred to the plural reference images and a live image to be imaged. Accordingly, the ultrasonic diagnostic apparatus 100 can display the harmonic image sequentially updated as a live image and the harmonic images of reference images corresponding to the same cross-section as the updated harmonic image concurrently.

In this case, those reference images include, e.g., a reference image that was imaged three days ago, a reference image that was imaged one week ago, and a reference image that was imaged one month ago, and the plural reference images whose imaging times are different from each other can be simultaneously displayed on the display 27.

(Second Embodiment)

In the first embodiment, the ultrasonic diagnostic apparatus 100 is equipped with the display 27 and the processing circuitry 24 which causes the display 27 to display a fundamental image as a live image at the time of alignment between the live image and the reference image. However, embodiments of the present disclosure are not limited to such an aspect.

In the second embodiment, for instance, the processing and the functions of the ultrasonic diagnostic apparatus 100 of the first embodiment are applied to a medical image processing apparatus, which does not include a ultrasonic prove for example, so that comparative medical image interpretation can be easily and precisely performed in the medical image processing apparatus as well.

For instance, when two volume data, which are obtained at different times and each of which includes fundamental images and harmonic images, exist, postoperative periodic follow-up observation of the same object can be performed. In this case, alignment processing is performed between two fundamental images each of which is extracted from the respective two volume data. Then, each of the two fundamental images is switches to each of the respectively corresponding two harmonic images, together with the alignment information of the two fundamental images.

Figure 7:
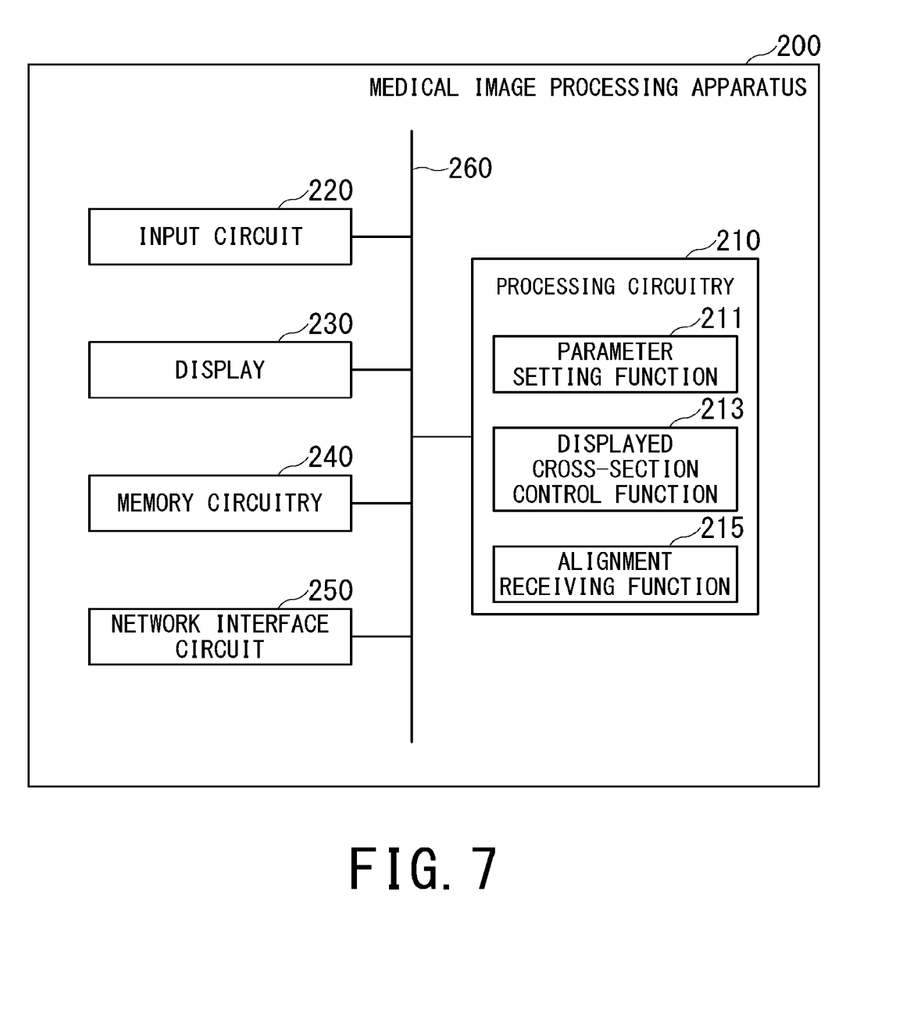
FIG. 7 is a schematic block diagram illustrating overall configuration of the medical image processing apparatus of the second embodiment.

FIG. 7 is a schematic block diagram illustrating overall configuration of the medical image processing apparatus 200 of the second embodiment.

As shown in FIG. 7, the medical image processing apparatus 200 of the second embodiment includes processing circuitry 210, an input circuit 220, a display 230, memory circuitry 240, a network interface circuit 250, and an internal bus 260.

The processing circuitry 210 is a processor corresponding to the processing circuitry 24, and the input circuit 220 is a circuit corresponding to the input circuit 26. Additionally, the display 230 is a device corresponding to the display 27, and the memory circuitry 240 is a circuit corresponding to the memory circuitry 25.

The processing circuitry 210 implements a parameter setting function 211 corresponding to the parameter setting function 241, a displayed cross-section control function 213 corresponding to the displayed cross-section control function 243, and an alignment receiving function 215 corresponding to the alignment receiving function 245 by reading out and executing predetermined programs from the memory circuitry 240.

The network interface circuit 250 performs communication control according to communications standards, and has a function of connecting the medical image processing apparatus 200 to an external network such as a wireless LAN (Local Area Network) in compliance with IEEE 802.11 series, short-distance radio communication, and phone lines.

The internal bus 260 interconnects the respective components of the medical image processing apparatus 200 so that the processing circuitry 210 can control the entirety of the medical image processing apparatus 200.

In the second embodiment, the medical image processing apparatus 200 acquires a first volume data and a second volume data, each including fundamental images and harmonic images, from outside via the network interface circuit 250, and stores the first and second volume data in the memory circuitry 240.

The medical image processing apparatus 200 includes the display 230 and the processing circuitry 210, and the processing circuitry 210 causes the display 230 to display first images of the first volume data acquired by contrast imaging and second images of the second volume data to be compared with this first image. In this case, the processing circuitry 210 causes the display 230 to display a fundamental image as one of the first images when alignment of the first image and the second image is performed.

In other words, when alignment is performed between the first images and the second images, although both of which include fundamental images and harmonic images obtained by using the contrast imaging, the processing circuitry 210 uses one of the fundamental images of the first images and one of the fundamental images of the second images.

In the second embodiment, each of the first images and the second images is not required to be a live image, any cross-sectional image based on volume data acquired in the past and any ultrasonic cross-sectional image can be used for the first images and the second images. In other words, when alignment between the first images and the second images is preformed, an operator can perform the alignment more easily than conventional technology only by displaying a fundamental image of at least one of the first image and the second image on the display 230 as an image for the alignment.

According to at least one of the above-described embodiments, alignment between the live image and the reference image can be easily and precisely performed when contrast imaging is performed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An ultrasonic diagnostic apparatus, comprising:
   a memory to store a program; and
   processing circuitry configured, by executing the program, to perform alignment between a live image of a plurality of live images and a reference image of a plurality of reference images,
   wherein the plurality of live images include a live fundamental image and a live harmonic image,
   when the alignment is performed, the live image is set to the live fundamental image and then the alignment is performed between the live fundamental image and the reference image, and
   after the alignment is completed, the live image is switched from the live fundamental image to the live harmonic image.

2. The ultrasonic diagnostic apparatus according to claim 1, wherein the plurality of reference images include a reference fundamental image and a reference harmonic image,
   when the alignment is performed, the reference image is set to the reference fundamental image, and
   after the alignment is completed, the reference image is switched from the reference fundamental image to the reference harmonic image.

3. The ultrasonic diagnostic apparatus according to claim 1, further comprising an image generation circuit configured to generate an image from a received signal,
   wherein the image generation circuit is configured to generate the live fundamental image and the live harmonic image as the plurality of live images, when a contrast imaging is performed.

4. The ultrasonic diagnostic apparatus according to claim 3,
   wherein the image generation circuit is further configured to generate the live fundamental image and the live harmonic image alternately frame by frame, when the contrast imaging is performed.

5. The ultrasonic diagnostic apparatus according to claim 3,
   wherein the image generation circuit is further configured to
      store a fundamental component and a harmonic component of the received signal when the contrast imaging is performed,
      generate the live fundamental image based on the stored fundamental component, and
      generate the live harmonic image based on the stored harmonic component.

6. The ultrasonic diagnostic apparatus according to claim 2, further comprising a display configured to display the reference image,
   wherein the processing circuitry is further configured to cause the display to display the reference fundamental image of the plurality of reference images or the reference harmonic image of the plurality of reference images based on volume data of the plurality of reference images.

7. A medical image processing apparatus, comprising:
   a memory to store a program; and
   processing circuitry configured, by executing the program, to perform alignment between a first image of a plurality of first images and a second image of a plurality of second images,
   wherein the plurality of first images include a first fundamental image and a first harmonic image,
   when the alignment is performed, the first image is set to the first fundamental image and then the alignment is performed between the first fundamental image and the second image, and
   after the alignment is completed, the first image is switched from the first fundamental image to the first harmonic image.

* * * * *